April 6, 1954                F. E. ULLMAN                2,674,256
                    LIQUID MIXTURE CONTROL APPARATUS
Filed Dec. 27, 1950                                3 Sheets-Sheet 1

April 6, 1954     F. E. ULLMAN     2,674,256
LIQUID MIXTURE CONTROL APPARATUS
Filed Dec. 27, 1950     3 Sheets-Sheet 2

Inventor
Fred E. Ullman

April 6, 1954   F. E. ULLMAN   2,674,256
LIQUID MIXTURE CONTROL APPARATUS
Filed Dec. 27, 1950   3 Sheets-Sheet 3
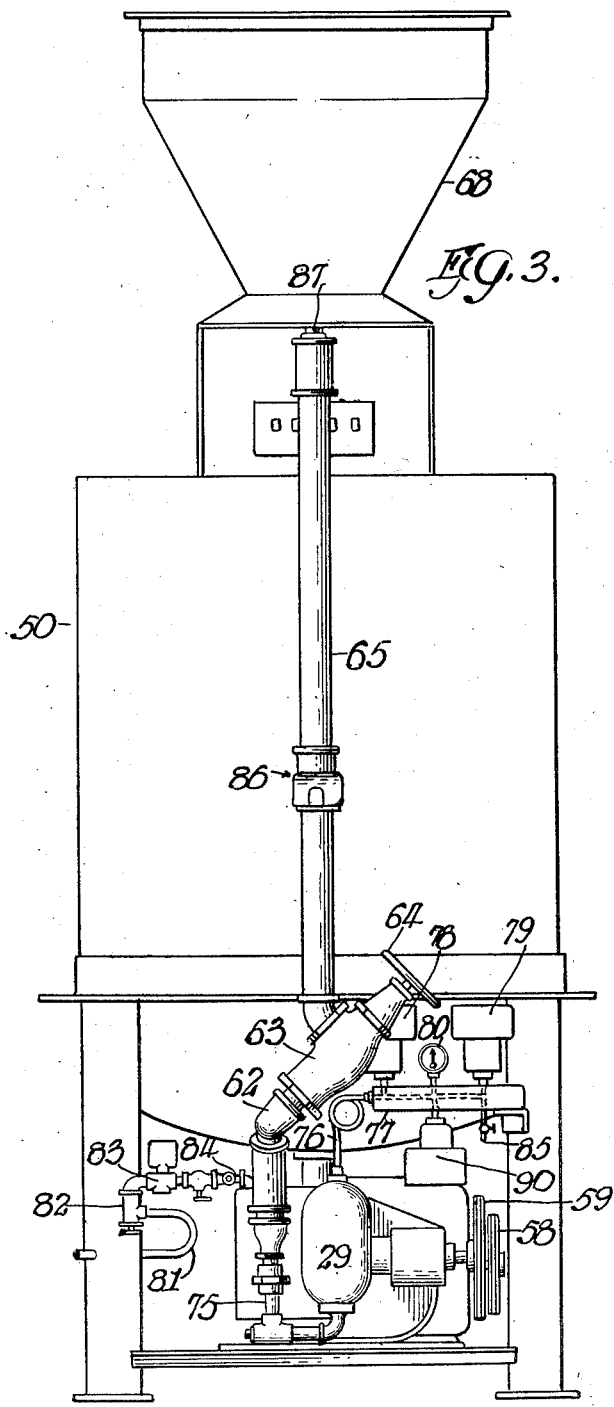
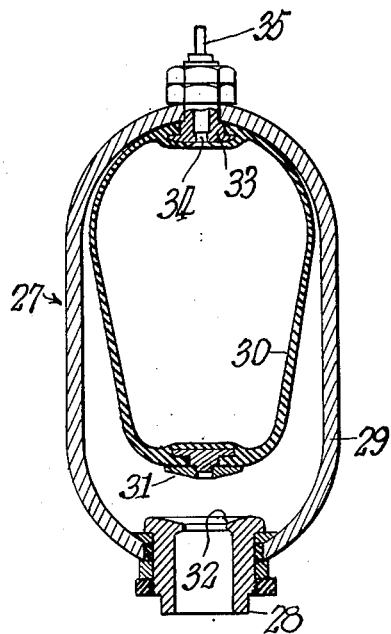
Inventor
Fred E. Ullman Patented Apr. 6, 1954

2,674,256

UNITED STATES PATENT OFFICE 2,674,256

LIQUID MIXTURE CONTROL APPARATUS

Fred E. Ullman, Winnetka, Ill., assignor to Triangle Package Machinery Company, Chicago, Ill., a corporation of Illinois Application December 27, 1950, Serial No. 202,834

14 Claims. (Cl. 137—92)

1

This invention relates in general to improvements in apparatus for automatically altering and controlling the viscosity, density, proportions of ingredients and other characteristics of liquids, solutions, and emulsions.

A particularly useful adaptation of the invention, described hereinafter, consists in employing the apparatus to regulate the viscosity of an adhesive solution by adding diluent whenever the solution becomes too viscous and by adding a concentrated supply of adhesive whenever the solution becomes too thin.

One object of the invention is to provide improved methods and means for automatically establishing a body of liquid within a desired viscosity range and for automatically maintaining the desired viscosity of the body.

Another object of the invention is to provide improved methods and means for automatically replenishing the supply of a body of liquid within a predetermined viscosity range by the automatically controlled addition of materials required to compensate in whole or in part for the liquid withdrawn from the body.

A further object of the invention is to provide an improved viscosity or density control apparatus which utilizes a high pressure chamber through which a stream of the solution to be controlled is circulated by means of a pump and regulating the addition of thickening and thinning materials to the solution by means responsive to the elevated pressure changes in said chamber.

Another object of the invention is to provide means for shifting the controlled viscosity or density range without individually adjusting the pressure responsive control elements themselves.

Other objects and advantages of the invention will be mentioned hereinafter or will become apparent from a perusal of the following specification, in which a preferred embodiment of the invention is illustrated and described for the purpose of describing the nature of the invention and the manner of its use.

Referring to the drawings:

Fig. 3 is an end elevation of the apparatus shown in Fig. 2.

2

Fig. 4 is a sectional view, on an enlarged scale, of a pressure transmitting chamber used in this apparatus, showing a rubber bladder therein at its normal relaxed position, i. e., neither distended nor compressed.

Figure 2:
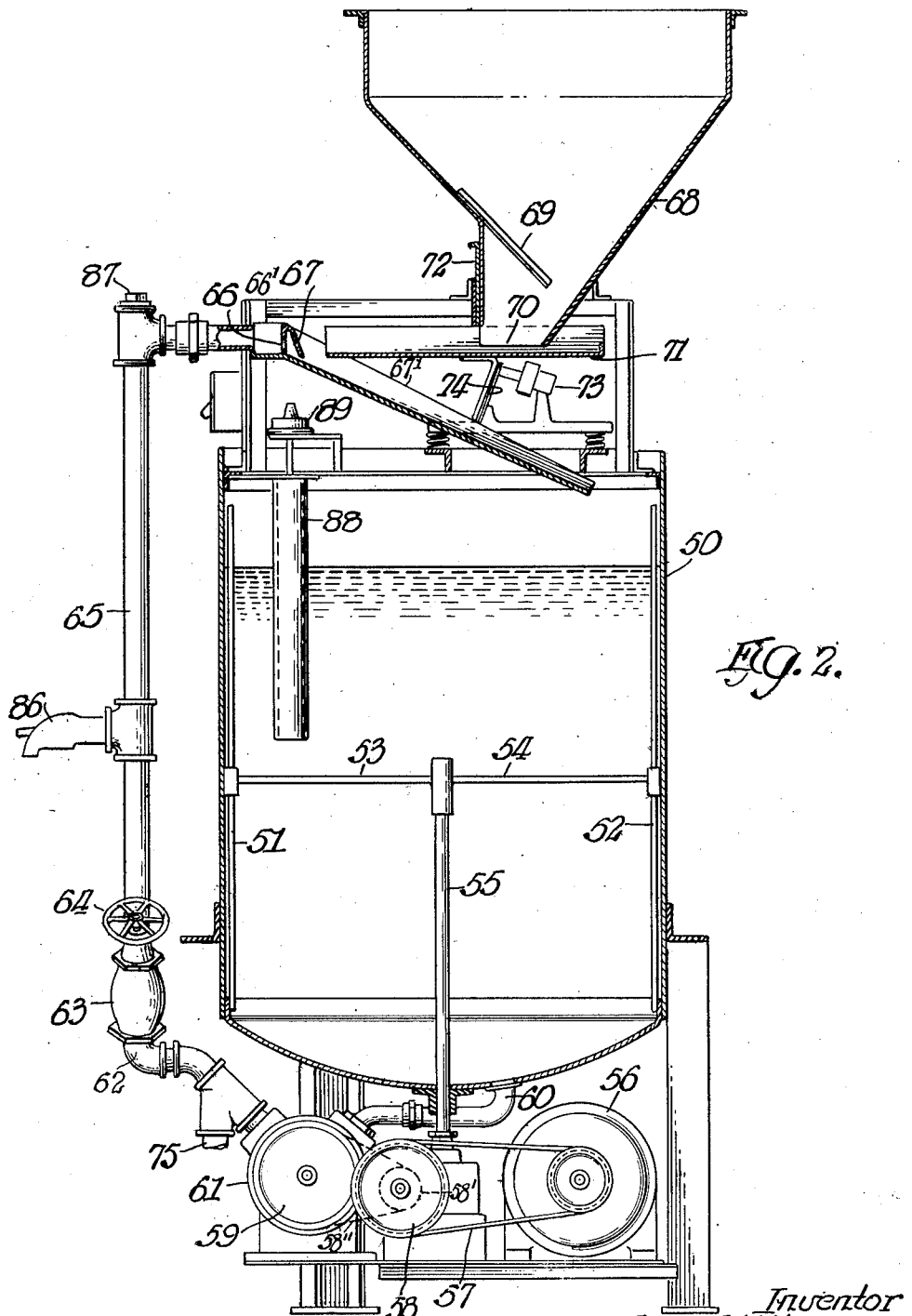
Fig. 2 is a side elevation, partly in section, of an apparatus especially adapted to feed a diluent and a dry ingredient to a solution.

Fig. 5 is a schematic layout of the control and signal circuits utilized in the apparatus shown in Figs. 2 and 3.

Figure 1:
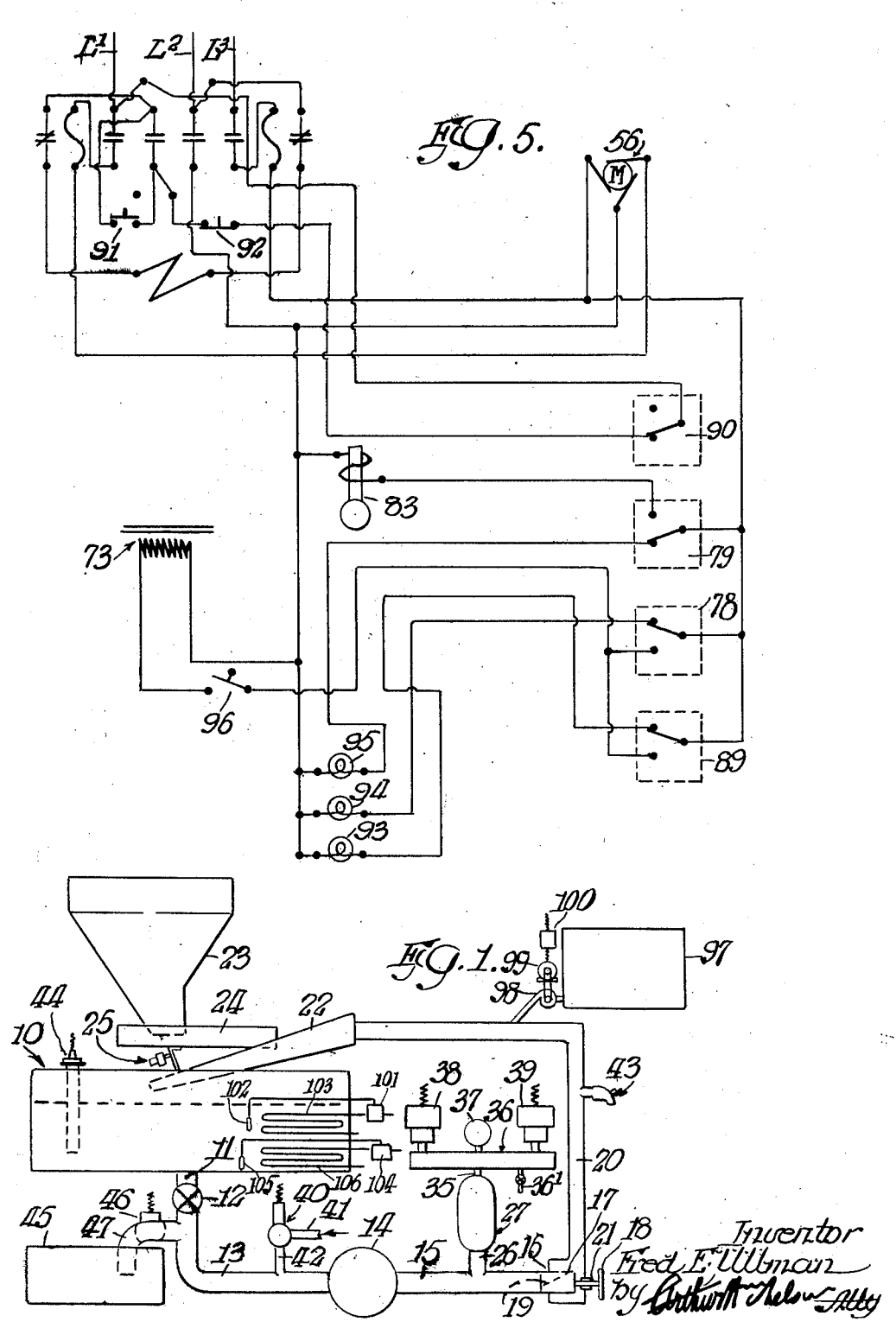
Fig. 1 is a schematic diagram, showing an apparatus made in accordance with this invention adapted for controllably adding a diluent and a thickening ingredient to a solution, the latter either as a dry ingredient or as a heavily concentrated solution or suspension of such ingredient.

Referring now to Fig. 1, there is represented a tank 10 in which a large quantity of the solution is maintained. For simplicity in description the solution will hereafter be referred to as an adhesive solution, although it will be understood that other solutions, whose viscosity or density needs to be controlled, can be regulated advantageously by means of this invention.

First, describing the structure of the diagrammatic layout in Fig. 1 in connection with the use of a dry ingredient, such as a dry adhesive, an outlet pipe 11 is connected to the bottom of the tank 10 and a normally open valve 12 located therein permits the solution to flow from the bottom of tank 10 into the pipe 13, thence to the pump 14, which preferably is a constant volume pump, which pump delivers the liquid into a high pressure chamber 15 which extends between the pump and an orifice 16 which is regulated by means of a cylindrical valve 17 having a handle 18 to facilitate its manual control.

In Fig. 1 the dotted line 19 suggests that the valve 17 has a tapered slot of V-shaped transverse cross section through which the solution emerges in a single stream from the chamber 15 into the return pipe 20. The valve 17 may be caused to enter further into the circular orifice 16 by rotation of the screw threaded shaft 21 connected with the handle 18, whereby the smaller end of the slot projects further into the orifice and further restricts the exit of the solution from the high pressure chamber. Conversely withdrawal of the valve 17 from the orifice presents a wider portion of the slot to thus increase the effective size of the orifice regardless of the radial or angular position of the slot.

The return pipe 20 delivers the solution back into a wide inclined trough 22 which preferably will be so shaped as to allow the liquid to spread out into a rather shallow layer of liquid.

The hopper 23, positioned as shown, delivers dry adhesive into a tray 24, which is intended to be controllably vibrated by means of an electrical vibrator 25 of suitable design commonly used for vibrating trays in such a manner. The vibration of the tray causes the dry adhesive particles to advance along the tray 24 to drop in widely dispersed form upon the top of the shallow layer of solution which is returning to the tank 10 through the trough 22. The solution falling into the tank will plunge beneath the liquid surface therein carrying the adhesive particles along.

Connected with the high pressure chamber 15 is a riser pipe 26 communicating with a pulsation dampener device generally indicated as 27, preferably of the type shown in Fig. 4. This device comprises an inlet connection 28 secured to a rigid hollow chamber 29 carrying an expansible bladder 30, preferably made of rubber, which carries a valve member 31 capable of seating upon and closing the valve seat 32. The valve member 31 is molded into the lower end of the bladder while the upper end of the bladder is also molded about the hollow outlet plug 33 which has an outlet passage 34 therethrough and to which the outlet pipe 35 may be connected. Pipe 35 is connected to a hollow tubular pressure transmitting chamber 36 on which are operatively mounted a pressure gauge 37 and the pressure operated switches 38 and 39.

While I prefer to use a gear type pump, as the pump 14, and such a pump can be designed to deliver a constant output at almost a uniform pressure, nevertheless there is some variation or pulsation in the output pressure from such a pump, and such pulsations are adequate enough to render uncertain and unreliable the operation of very sensitive pressure controlled switches, such as I prefer to use.

The details of construction of these switches do not form a part of this invention but it will be explained that for the purpose of controlling an adhesive solution I prefer to use a low pressure operated switch 38 and a higher pressure operated switch 39 designed to be actuated by pressures of 52 and 54 pounds respectively. As each switch will have normally a lag of a few ounces between the pressures which will cause it to operate one way and the lower pressure which will enable it to restore, it is quite important to prevent pulsations due to such a cause as the pump itself from operating these switches when the actual or average pressure in chamber 15 would not operate them. Accordingly such variations in pressure as are imposed on the solution flowing through the high pressure chamber 15, whether due to the pump pulsations or variations in the viscosity of the solution are transmitted to the interior of the chamber 29 and applied then to the outside surface of the bladder. Bladder 30, and the pipe 35 and the chamber 36 contain trapped air which is subject to the pressure applied to the outside of the bladder. The pressure operated switches are sealed off from the adhesive by means of the bladder and none of the air in the electric air cushion can be absorbed into the adhesive.

Hence, pulsations due to the action of the pump are transmitted through the relatively small inlet pipe 28 to the interior of the relatively large chamber 29 and are imposed upon the compressible bladder 30.

The pressure variations due to such pulsations are thus diminished in their effect upon the air held trapped under compression in and beyond the bladder, and the elastic cushion of air thus enables the pressure operated switches to operate substantially unaffected by such pulsations.

By way of example, and not with the intention of limiting the use of the invention to any specific pressure ranges, it may be said that the equipment (thus far described in connection with Fig. 1) may be operated as follows: Air under about 25 lbs. pressure is preliminarily introduced into the bladder 30 and chamber 36 through a valve controlled pipe 36' and is held trapped therein when the valve in pipe 36' is closed again.

The pump 14 is thereafter started and causes the adhesive solution to circulate from the bottom of the tank through pipes 11, 13 and through the high pressure chamber 15 past the orifice regulating valve 17 through pipe 20 back to the tank.

The preliminary charging pressure of twenty-five pounds, or some other pressure, is so selected that, when the pressure in the high pressure chamber is between the rated low and high operating pressure of the control switches, the bladder will be restored approximately to the relaxed position shown in Fig. 4, so that the air cushion may not then be subject to pressure due to elastic distention of the rubber itself.

If, as in a presently preferred embodiment of the invention, the low pressure switch is designed to operate at 52 p. s. i. and the high pressure switch at 54 p. s. i. the orifice control valve 17 will be so adjusted that when an adhesive of a selected desirable viscosity is being pumped through the high pressure chamber the gauge 37 will indicate a pressure between 52 and 54 p. s. i., and substantial variation of the viscosity will cause one or the other of the switches to operate.

If the pressure drops below 52 lbs. switch 38 will operate and a circuit will be established to energize the vibrator 25 to cause the dry powdered adhesive to be advanced by the tray 24 into the chute 22 where this adhesive falls onto the returning solution, mingles therewith and plunges beneath the surface of the solution as it enters the tank.

The adhesive will become more thoroughly and uniformly mixed with the solution as it passes later through the pump 14 and the recirculating system. When the viscosity rises sufficiently, due to the addition of dry adhesive, to cause the pressure in the chamber 15 to attain 52 lbs. or go slightly thereabove, the switch 38 will reoperate, and deenergize the vibrator 25, thus stopping the feeding of the dry adhesive. Thereafter the pump 14 will continue to circulate the solution through the system and keep it properly agitated and mixed. As long as the pressure in the chamber 15 remains between 52 and 54 lbs. no dry adhesive or water will be added. However, if the pressure exceeds 54 lbs. due to excessive viscosity the switch 39 will operate to cause the electrically operated valve 40 to open and admit water from pipe 41 through pipe 42 into the inlet side of the pump. This addition of water will gradually dilute the whole batch of solution and eventually the pressure in the chamber 15 will drop down below 54 lbs. at which time the pressure operated switch 39 will reopen and the addition of water will be stopped.

As shown in Fig. 1 a valve 43 is positioned preferably in the return pipe line 20 for the withdrawal of quantities of the solution as needed.

Whenever the liquid level in the tank 10 drops below a predetermined level, a pressure responsive switch 44, the details of whose construction need not here be described, will be operated by the decrease in pressure therein and will cause the vibrator mechanism 25 to again be energized and feed more dry adhesive into the trough 22. This addition of adhesive will, of course, increase the viscosity which will soon have its effect felt in the high pressure zone 15 whereupon the switch 39 will close and cause water to be admitted, as heretofore described. When the liquid level in the tank 10 finally attains the desired level, switch 44 will cut off the vibrator 25 and when the desired viscosity range has been attained, the addition of water will be stopped, as has heretofore been explained.

The schematic diagram in Fig. 1 illustrates also how this mechanism may be used to increase the viscosity by adding a concentrated solution of the adhesive rather than a dry powdered adhesive. If preferred, or if dry adhesive is not available, the vibrator 25 may be disconnected and a tank 45 can be supplied with concentrated liquid adhesive. In this connection the hand valve 12 will be partially closed or the valve 12 may be a vacuum operated valve adjusted to restrict the flow of solution therethrough so that in the pipe 13 there will be maintained a subatmospheric pressure due to the suction action of the pump 14 on the solution flowing through the valve 12.

Whenever the liquid level control switch 44 or the switch 38 call for the addition of adhesive the actuation of either one of them will cause an electrically operated valve 46 to be opened, whereupon the suction in the pipe 13 will cause the concentrated adhesive solution to rise through the pipe 47 and enter the pipe 13 and flow thence to the pump. When the proper liquid level is established in the tank 10 and the viscosity is high enough to cause the switch 38 to reoperate the valve 46 will again be closed and the addition of heavy adhesive liquid will then be stopped.

The foregoing description applied to Fig. 1 portrays in general how my invention is used for maintaining a desired viscosity in a batch of solution stored in the tank 10 and constantly being recirculated therefrom and back again thereto.

Figs. 2 and 3 illustrate a commercial embodiment of my apparatus designed for utilizing a dry adhesive, and Fig. 5 shows the electrical circuits associated therewith.

The tank 50 constitutes the storage tank for holding the solution which is to be recirculated by means of the pump through a high pressure zone and returned to the tank. Inasmuch as adhesive solutions have a tendency to coat the walls of tanks in which they are stored, I prefer to provide stirring arms such as 51 and 52 connected by means of the arms 53 and 54 to a shaft 55 which, through a suitable arrangement of gears (not shown) is driven by means of the motor 56.

The motor 56, through any suitable power transmission means such as, for example, a belt 57, pulley 58, pulley 58', belt 58'', and another pulley 59, drives a pump 61, preferably of the gear type, which withdraws solution from the bottom of the tank 50 through a pipe 60, thence through the pump 61 and delivers it into the pipe 62 constituting a part of the high pressure zone from which it emerges through a valve 63 manually operated by means of the valve handle 64. This valve corresponds functionally and generally in structure with valve 17 shown in Fig. 1.

The solution, after passing through an adjustably restricted orifice controlled by the valve 63, flows into the return pipe 65, thence through horizontally spaced apertures, such as 66 in the vertical baffle 66', thence underneath the spreader baffle 67 into the inclined trough 67'. This trough has substantial width and the baffles cause the stream of liquid to spread out therein in a rather thin layer as it flows downwardly into the tank 50.

The hopper 68, mounted as shown, upon the top of the tank is intended to hold a supply of dry powdered adhesive which flows past a fixed baffle 69, thence through the bottom outlet 70 of the hopper into the vibrating tray 71. A manually adjustable gate 72 may be employed to limit the rate of flow of adhesive from the hopper onto the vibrating tray.

A magnetic vibrator device 73 of any well known and suitable construction connected to the flexible member 74, in turn connected to the bottom of the tray is employed to vibrate the tray during such periods as it is desired to feed dry adhesive into the trough 67'.

The normal action of the vibrator is to cause the powdered adhesive to spread out in a thin layer as it advances along tray 71, hence it is widely dispersed when it falls on the layer of liquid in trough 67'.

As shown in Fig. 3, a pipe 75 is suitably connected to the outlet pipe 62 leading from the pump and is connected to the bottom of the pulsation dampener 29, previously described and shown in Fig. 4. Thus, the pressure produced by the pump and maintained in the high pressure zone represented by the pipe 62 is transmitted through the pulsation dampener 29, unaffected by variations resulting from the pulsations of the pump, through a coiled rubber pipe 76 to the distributor 77 which has a passage extending lengthwise thereof to which the pressure operated switches 78, 79 and the gauge 80 are operatively connected so as to be subject to the pressure in the high pressure zone.

For regulatably admitting water for the purpose of thinning the solution, when it requires thinning, I provide pipe 81 connected to a suitable source of water supply, in which is interposed a manually operated throttling valve 82 for regulating the rate of flow and an electrically operated valve 83, which is under control of the pressure operated switch 79, for admitting water through the pipe 84 to the pipe 60 at the inlet side of the pump.

In view of the preceding description of the apparatus shown schematically in Fig. 1, a brief description of that which is shown in Figs. 2 and 3 will be adequate for an understanding thereof. The apparatus is placed in condition for operation first by admitting air under pressure through the valve controlled pipe 85, which will supply air into the distributor 77 and the bladder 30 of the pressure regulator 29 until the desired preliminary charging pressure is attained in the air cushion in that system. The pressure thus supplied will temporarily seat the valve 31, but the pump pressure will later unseat it and at optimum pressure preferably should maintain the bladder 30 at about the position shown in Fig. 4.

Thereafter, the valve in the line 85 will be closed and the air trapped thereby will then be subject to the pressure which builds up when the pump 61 is started up. If the pressure falls below a predetermined value such as 52 lbs., for example, due to a decrease of viscosity, the pressure operated switch 79 will operate to energize the magnetic vibrator 73 to vibrate the tray 71 to feed more dry adhesive into the system. When the predetermined pressure range of 52 to 54 lbs. is attained, this switch will be reversed in operation and the feed of dry adhesive will stop.

Should the viscosity rise to such an extent that the pressure builds up above 54 lbs. for example, the other pressure operated switch 79 will operate to admit water through the electrically operated valve 83 to furnish a diluent for the solution.

The adhesive solution may be drawn off as needed through a hand operated cock 86, or if desired, the plug 87 may be removed and a pipe line distribution system connected at that point for delivering the adhesive solution to various points of use.

For controlling the liquid level in the tank 50 I provide a tube 88 in which air will be trapped and compressed by the adhesive solution, for the purpose of actuating a pressure operated switch 89 which will serve to feed dry adhesive to the tank by the action of the vibrating member 73, as has been more fully explained in connection with Fig. 1, whenever the liquid level falls below a predetermined minimum.

In the wiring diagram shown in Fig. 5, leads L1, L2 and L3 indicate the source of supply of current, not only to the motor M or 56 but also to the control system. A safety high pressure switch, not heretofore described, shown in Fig. 3 and designated 90 is provided and is subject to the pressure in the distributor 77, and in the event the pressure in the high pressure zone builds up excessively to such a figure as 85 lbs. for example, this switch 90 will open and, as will be perceived from the wiring diagram, will cut off the current to the motor. This safety provision is included in order to prevent damage to the pressure operated switches 78 and 79.

91 and 92 are the starting and stopping buttons respectively for the motor. It is to be understood that during the use of the machine the motor and the pump will run continuously.

The pressure operated switches 78, 79, 89 and 90 shown in the wiring diagram are shown in the position which they normally occupy when the motor is running and the viscosity of the solution is within the desired range, and when neither water nor dry adhesive is being fed into the system. At such a time, signal light 93 will be illuminated showing that the liquid level is satisfactory, the signal light 94 will be illuminated, indicating that the viscosity is above the lower limit and that no adhesive is being fed into the system, and the signal light 95 will be illuminated indicating that the viscosity is below the upper limit and that pressure switch 79 has not been operated to admit water. An additional manually operated switch 96 (normally closed) is provided to furnish additional shut off control over the vibrating mechanism.

It should now be explained that in the event a heavy concentrated liquid adhesive is being utilized in place of a dry adhesive, for increasing the viscosity of the mixture, the vibrating element 73 may be replaced in the same circuit by an electrically operated valve 46, as has been explained in connection with Fig. 1 and the appropriate storage tank, pipes and valves will be added, as is clear from Fig. 1.

Instead of drawing by suction a concentrated liquid adhesive from a tank corresponding to tank 45 of Fig. 1, I may choose to store the concentrated liquid in a tank such as 97 (Fig. 1) and discharge it into the return pipe 20 of Fig. 1 or 65 of Fig. 2, by means of a pump 98 driven by motor 99 have a starting switch 100 controlled by the pressure operated switch 78 of Figs. 3 and 5 or switch 38 of Fig. 1.

Inasmuch as a machine of this character will be used by a commercial user at various times to provide adhesive mixtures of different viscosities, the manually adjustable valve 17 shown in Fig. 1, and its counterpart valve 63 shown in Figs. 2 and 3, enable the operator to adjust the size of the orifice through which the solution emerges from the high pressure zone 15 or 62. Thus, if he desires to readjust the apparatus so that it will produce and maintain an adhesive solution of higher viscosity than has previously been maintained he will open the adjustable orifice, usually to an extent determined by previous experience, which will immediately cause the pressure in the high pressure zone to drop. This will, of course, through the automatic operation of the controls, cause more dry adhesive or a concentrated adhesive liquid, to be fed into the system until the pressure in the pressure zone again rises above the lower limit for which the switch 78 had been set, for example, 52 lbs., at which time this switch will operate to cut off the further supply of concentrated or dry adhesive. Thereafter the apparatus will automatically regulate itself as it did before this manual adjustment of the valve 17, or 63, and it will continually produce and maintain an adhesive of the desired higher viscosity. It is contemplated that the viscosity of the mixture may be measured occasionally by any standard viscosimeter in order to determine whether the viscosity required by plant operations is being maintained.

It is recognized that the temperature of the adhesive or other liquid being circulated may vary responsive to changes in the ambient atmosphere or also due to friction resulting from its continued recirculation, and that such temperature variations may alter the viscosity of the liquid enough to interfere with the intended function of the viscosity control mechanism described above. Hence, I may provide means for controlling the temperature of the liquid and have illustrated schematically such means in Fig. 1. For example, a thermostatically operated valve 101 having a thermally responsive element 102 extending into the tank 10 may regulate the flow of a cooling medium through coil 103 whenever the liquid in the tank requires cooling to hold it at a selected optimum temperature. A thermostatically operated valve 104, having a thermally responsive element 105 extending into the tank may be used to regulate the flow of a heating medium through coil 106 whenever the liquid in the tank requires heating to hold it at a desired temperature.

Whereas adhesive powers or concentrated adhesive liquid do not mix into and disperse in the liquid already in the system as readily as does the water added for dilution purposes, it will generally be most satisfactory to add the viscosity increasing material into the stream of liquid returning to the storage tank where some mixing and dispersion can occur before the effect of such added material is impressed upon the viscosity responsive control apparatus. On the other hand, it is generally better to add the water or other thinning material just ahead of the recirculation pump, whereby a quick response in control is obtained and the risk of over dilution is minimized.

In commercial operation it will be noted that the rate or speed of solubility of various adhesives is not the same and that at times, especially following the addition of more adhesive, when such addition has been terminated by the control mechanism, the viscosity may subsequently undergo a change, either increasing or decreasing, depending on the character of the materials used. But in any such case, any departure from the selected control range will cause the control mechanism to re-operate and automatically effect the needed correction. Whenever a specified adhesive quality is proportional to viscosity and when uniformity is a positive requirement, it will be appreciated that a machine made in accordance with this invention can be relied upon to maintain ready for use a body of adhesive meeting such requirements.

It will be appreciated that by this simple adjustment just described, involving the manipulation of the hand valve 63, the same apparatus may be employed for producing and maintaining viscous liquids of various viscosities according to varying plant demands and when once adjusted it will automatically maintain the desired viscosity.

If the characteristic of a liquid to be controlled is proportional to the viscosity of the liquid the hereindescribed methods and means may be used for such control purposes even though the end sought may be one other than viscosity control as such.

While a preferred embodiment of the invention has been described with considerable detail herein, it should be understood that the invention is not limited to the details of construction shown but comprises other modifications and variations within the scope of the claims appended hereto. In the claims the term "constant volume pump" means a pump which discharges a substantially constant volume as distinguished from a pump of the centrifugal type wherein the volume of the discharge can vary widely.

Having shown and described my invention, I claim:

1. An apparatus for regulatably proportioning the components of a liquid mixture comprising a storage tank for the mixture, a high pressure chamber, a circulating system including a constant volume pump connected for pumping liquid from said tank and through said chamber and thereafter back to said tank, an orifice in the system restricting the liquid flow from the outlet end of the chamber to said tank, a pressure operated switch responsive at one predetermined pressure in said chamber for electrically controlling the addition of one component to said mixture, and a second pressure operated switch responsive to a predetermined higher pressure in said chamber for controlling the addition of another component to the mixture, said components being added to the mixture at such a point as to avoid altering the volume of liquid flowing through the chamber, the pump and orifice coacting to maintain a pressure of several atmospheres in said chamber.

2. An apparatus for regulatably proportioning the components of a liquid mixture comprising a storage tank for the mixture, a high pressure chamber, a circulating system including a constant volume pump arranged for pumping liquid at low pressure from said tank and through said chamber under a higher pressure and thereafter back to the tank, an orifice in the system restricting the liquid flow from the outlet end of the chamber to said tank, means responsive to a predetermined pressure in said chamber for regulating the addition of a viscosity increasing component to said mixture, and separate means responsive to a higher predetermined pressure in said chamber for regulating the addition of a viscosity decreasing component to said mixture, said components being added to the mixture at such a point as to avoid altering the volume of liquid flowing through the chamber, the pump and orifice coacting to maintain a pressure of several atmospheres in said chamber.

3. An apparatus for regulatably proportioning the components of a liquid mixture comprising a storage tank for the mixture, a high pressure chamber, a circulating system including a constant volume pump arranged for pumping liquid at low pressure from said tnak and through said chamber under a higher pressure and thereafter back to the tank, an orifice in the system restricting the liquid flow from the outlet end of the chamber to said tank, means responsive to a predetermined pressure in said chamber for regulating the addition of a viscosity increasing component to said mixture, separate means responsive to a higher predetermined pressure in said chamber for regulating the addition of a viscosity decreasing component to said mixture, and means controlled by the liquid level in said tank for regulating the addition of one of said components to the mixture, said components being added to the mixture at such a point as to avoid altering the volume of liquid flowing through the chamber, the pump and orifice coacting to maintain a pressure of several atmospheres in said chamber.

4. An apparatus for regulatably proportioning the components of a liquid mixture comprising a storage tank for the mixture, a high pressure chamber, a circulating system including a constant volume pump arranged for pumping liquid at low pressure from said tank and through said chamber under a higher pressure and thereafter back to the tank, an orifice in the system restricting the liquid flow from the outlet end of the chamber to said tank, means for adjusting the size of said orifice, means responsive to a predetermined pressure in said chamber for regulating the addition of a viscosity increasing component to said mixture, and separate means responsive to a higher predetermined pressure in said chamber for regulating the addition of a viscosity decreasing component to said mixture, said components being added to the mixture at such a point as to avoid altering the volume of liquid flowing through the chamber, the pump and orifice coacting to maintain a pressure of several atmospheres in said chamber.

5. An apparatus for regulatably proportioning the components of a liquid mixture comprising a storage tank for the mixture, a high pressure chamber, a circulating system including a constant volume pump arranged for pumping liquid at low pressure from said tank and through said chamber under a higher pressure and thereafter back to the tank, an orifice in the system restricting the liquid flow from the outlet end of the chamber to said tank, means for adjusting the size of said orifice, means responsive to a predetermined pressure in said chamber for regulating the addition of a viscosity increasing component to said mixture, separate means responsive to a higher predetermined pressure in said chamber for regulating the addition of a viscosity decreasing component to said mixture, and means controlled by the liquid level in said tank for regulating the addition of one of said components to the mixture, said components being added to the mixture at such a point as to avoid altering the volume of liquid flowing through the chamber, the pump and orifice coacting to maintain a pressure of several atmospheres in said chamber.

6. An apparatus for regulatably proportioning the components of a liquid mixture comprising a storage tank for the mixture, a high pressure chamber, a circulating system including a constant volume pump arranged for pumping liquid at low pressure from said tank and through said chamber under a higher pressure and thereafter back to the tank, an orifice in the system restricting the liquid flow from the outlet end of the chamber to said tank, means in said system for dispersing in the form of a widened stream the liquid being returned to the tank by said pump, means responsive to a predetermined pressure in said chamber for regulatably adding in widely dispersed form upon said widened stream a dry pulverulent viscosity increasing component, and separate means responsive to a higher predetermined pressure in said chamber for regulatably adding a viscosity decreasing component to said mixture, said components being added to the mixture at such a point as to avoid altering the volume of liquid flowing through the chamber, the pump and orifice coacting to maintain a pressure of several atmospheres in said chamber.

7. An apparatus for regulatably proportioning the components of a liquid mixture comprising a storage tank for the mixture, a high pressure chamber, a circulating system including a constant volume pump connected for pumping liquid from said tank and through said chamber and thereafter back to said tank, an orifice in the system restricting the liquid flow from the outlet end of the chamber to said tank, a pressure operated switch responsive at one predetermined pressure in said chamber for electrically controlling the addition of one component to said mixture, a second pressure operated switch responsive to a predetermined higher pressure in said chamber for controlling the addition of another component to the mixture, means entrapping a body of air under pressure in operative relation to said switches including flexible means subject to the pressure on the liquid created in the chamber by said pump for transmitting the chamber pressure to said body of air for rendering the switches thereby subject to the chamber pressure, the liquid displaced in the chamber responsive to pump pulsations being but a small fraction of the total volume of trapped air indirectly subject to such pulsations, said components being added to the mixture at such a point as to avoid altering the volume of liquid flowing through the chamber, the pump and orifice coacting to maintain a pressure of several atmospheres in said chamber.

8. An apparatus for regulatably proportioning the components of a liquid mixture comprising a storage tank for the mixture, a high pressure chamber, a circulating system including a constant volume pump arranged for pumping liquid at low pressure from said tank and through said chamber under a higher pressure and thereafter back to the tank, an orifice in the system restricting the liquid flow from the outlet end of the chamber to said tank, means for adjusting the size of said orifice, means responsive to a predetermined pressure in said chamber for regulating the addition of a viscosity increasing component in widely dispersed form to the liquid being returned from said chamber to said tank, separate means responsive to a higher predetermined pressure in said chamber for regulating the addition of a viscosity decreasing component to said mixture, and means controlled by the liquid level in said tank for regulating the addition of one of said components to the mixture, said components being added to the mixture at such a point as to avoid altering the volume of liquid flowing through the chamber, the pump and orifice coacting to maintain a pressure of several atmospheres in said chamber.

9. An apparatus for regulatably proportioning the components of a liquid mixture comprising a storage tank for the mixture, a high pressure chamber, a circulating system including a constant volume pump arranged for pumping liquid at low pressure from said tank and through said chamber under a higher pressure and thereafter back to the tank, an orifice in the system restricting the liquid flow from the outlet end of the chamber to said tank, means for adjusting the size of said orifice, means responsive to a predetermined pressure in said chamber for regulating the addition of a viscosity increasing component to said mixture, separate means responsive to a higher predetermined pressure in said chamber for regulating the addition of a viscosity decreasing component to said mixture at the intake side of the pump, and means controlled by the liquid level in said tank for regulating the addition of one of said components to the mixture, said components being added to the mixture at such a point as to avoid altering the volume of liquid flowing through the chamber, the pump and orifice coacting to maintain a pressure of several atmospheres in said chamber.

10. An apparatus for regulatably proportioning the components of a liquid mixture comprising a storage tank for the mixture, a viscosity reacting device, a constant volume pump arranged for pumping a liquid stream from said tank through said viscosity reacting device and back to the tank, means responsive to increased resistance to flow of the stream through said viscosity reacting device for regulating the addition of a viscosity decreasing component to the liquid entering said pump and responsive to decreased resistance to the stream flow through said device for regulating the addition of a viscosity increasing component in widely dispersed form to said stream being returned to the tank from said device.

11. A liquid mixture control apparatus embodying therein a liquid mixture storage tank, a suitably driven pump having a connection to its intake through which it receives a liquid mixture from said storage tank, means for returning the mixture from the pump discharge to the storage tank, a restriction in the return means for raising the pressure in the zone between the discharge side of the pump and the restriction, means responsive to a predetermined pressure in said zone for controlling the addition of a viscosity decreasing liquid at the intake side of the pump, and separate means responsive to a predetermined lower pressure in said zone for controlling the addition of a viscosity increasing material at a point in the return between said restriction and the storage tank.

12. A liquid mixture control apparatus embodying therein a liquid mixture storage tank, a suitably driven pump having a connection to its intake through which it receives a liquid mixture from said storage tank, means for returning the mixture from the pump discharge to the storage tank, a restriction in the return means for raising the pressure in the zone between the discharge side of the pump and the restriction, means responsive to a predetermined pressure in said zone for controlling the addition of a viscosity decreasing liquid at the intake side of the pump, and separate means responsive to a predetermined lower pressure in said zone for controlling the addition of a dry viscosity increasing material at a point in the return between said restriction and the storage tank.

13. A liquid mixture control apparatus embodying therein a liquid mixture storage tank, a suitable constant volume pump having a connection to its intake through which it receives a liquid mixture from said storage tank, means for returning the mixture from the pump discharge to the storage tank, a restriction in the return means for raising the pressure in the zone between the pump discharge and the restriction, a pressure operated switch responsive to a predetermined pressure which obtains in said zone for controlling the addition of a viscosity decreasing fluid at the intake of the pump, a separate pressure operated switch responsive to a predetermined lower pressure in said zone for controlling the addition of a viscosity increasing material at a point in the return between the restriction and the storage tank, and pulsation damping means connected to said zone and to said pressure switches for diminishing the effect of pump pulsations on said switches.

14. A liquid mixture control apparatus embodying therein a liquid mixture storage tank, a suitably driven pump having a connection to its intake through which it receives a liquid mixture from said storage tank, means for returning the mixture from the pump discharge to the storage tank, a restriction in the return means for raising the pressure in the zone between the discharge side of the pump and the restriction, means responsive to a predetermined pressure in said zone for controlling the addition of a viscosity decreasing liquid at the intake side of the pump, means for causing the liquid mixture to flow as a widened stream through at least a part of said return, separate means responsive to a predetermined lower pressure in said zone for controlling the addition of a pulverulent viscosity increasing material to said widened stream, and means for causing said pulverulent viscosity increasing material to discharge into said widened stream in widely dispersed form.

References Cited in the file of this patent

UNITED STATES PATENTS

| Number | Name | Date |
| --- | --- | --- |
| 1,944,243 | Kegl | Jan. 23, 1934 |
| 2,557,341 | Carrier | June 19, 1951 |
| 2,590,538 | Huck | Mar. 25, 1952 |

FOREIGN PATENTS

| Number | Country | Date |
| --- | --- | --- |
| 482,494 | Great Britain | Mar. 30, 1938 |